UNITED STATES PATENT OFFICE.

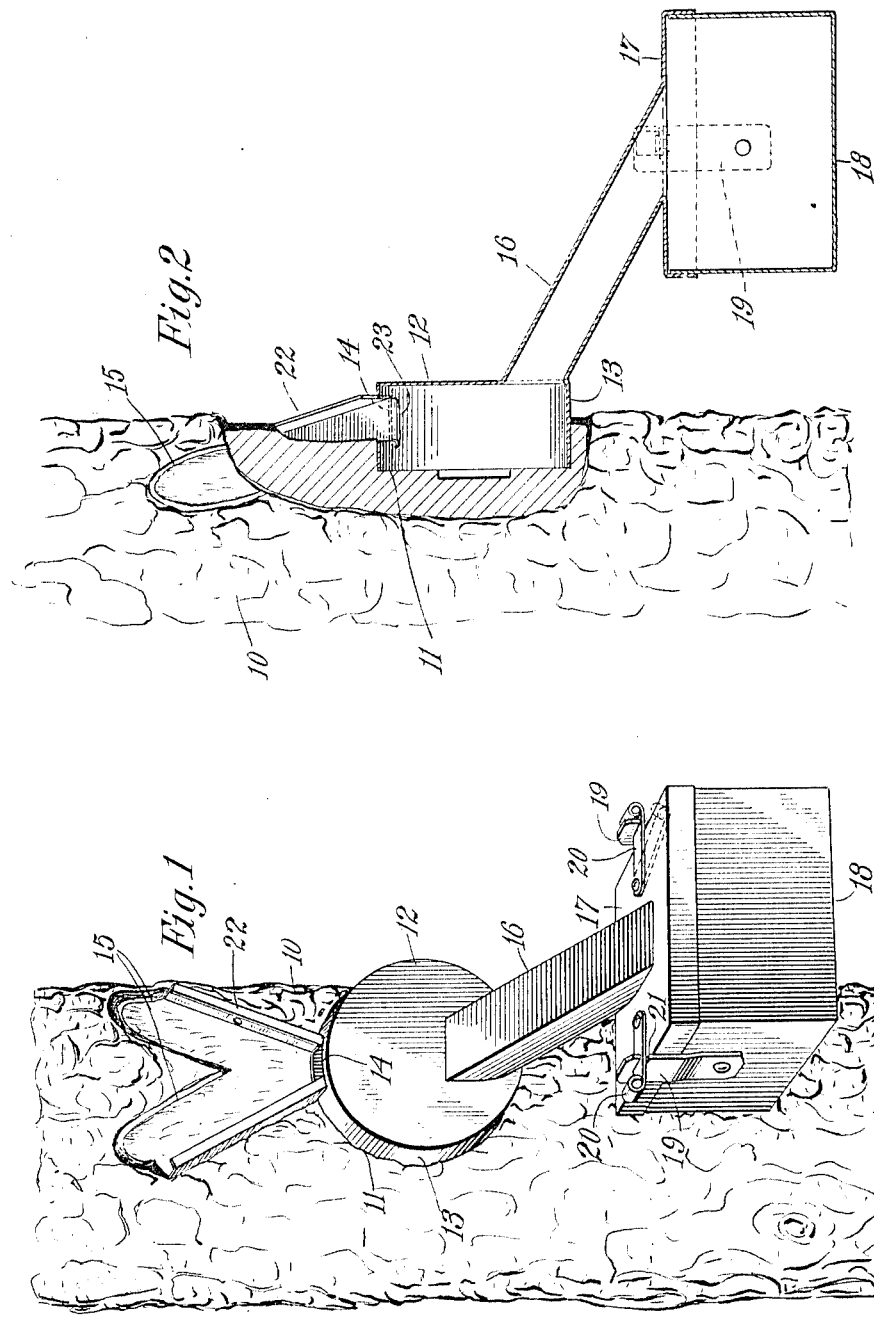

FREDERICK WILLIAM DOCK, OF WILMINGTON, NORTH CAROLINA.

TURPENTINE-BOX.

1,040,527.  Specification of Letters Patent.  Patented Oct. 8, 1912.

Application filed June 20, 1911. Serial No. 634,320.

*To all whom it may concern:*

Be it known that I, FREDERICK WILLIAM DOCK, a citizen of the United States, residing at 607 Dock street, Wilmington, North Carolina, have invented certain new and useful Improvements in Turpentine-Boxes, of which the following is a full, clear, and exact description.

This invention relates to an improved form of receptacle used for extracting and collecting turpentine from the pine tree, and while especially adapted for this purpose, it is not specifically limited to this particular use.

The improved receptacle may be used to collect the sap or gum from the maple, or for collecting gums from any of the gummiferous trees.

The invention refers more particularly to a receptacle that is adapted to be attached to the tree and wherein it is not necessary to remove the same from the tree to open the wound once formed or to enlarge said wound for the purpose of maintaining a constant flow of the turpentine, rosin, gum, or the like. Heretofore it has been customary, in devices of this kind, to bore a hole in the tree which serves as a wound, and over which is attached a spout slightly larger than said tap hole. The objections incident to such a method of extraction are many. In the first place such a wound gradually heals and the sap, exuding therefrom, ceases to flow thereby necessitating a frequent removal of the receptacle to renew the wound by the enlargement of the hole. The frequent enlargement of this tap hole not only endangers the life of the tree but weakens the same to such an extent that it is liable to be blown down by a sharp wind. In the old chipping process the contents of the box or receptacle, which was formed either in the tree or separate therefrom, were exposed to chips, dirt, etc., and subject to evaporation thereby causing a substantial loss thereof both as to quantity and value. These objections I have sought to overcome incident to the use of my device.

Referring to the drawing wherein like characters refer to the same parts in all the figures; Figure 1 is a perspective view of my device shown attached to the tree to be sapped. Fig. 2 is a vertical cross section of the device embodying my invention.

The reference character 10 designates the body of the tree having the auger hole 11 in which the cap 12 is inserted. It is to be understood that the cap 12 fits snugly in the hole 11 the flange 13 thereof making intimate contact with the walls of the hole 11 affording thereby a support for the receptacle proper. This cap has a slot 14 cut centrally in the upper portion thereof and through which the sap or turpentine, oozing from the chipped surfaces 15, formed by an ordinary chipper, can readily pass. The back side of the slot 14, in normal position should be substantially flush with or slightly beyond the chipped surface to avoid obstructing the flow of the sap through the flange 13 into cap 12. To the cap adjacent the lower side thereof is connected, preferably integral therewith, a spout 16 of any desired length. This spout is in turn similarly connected to the cover 17 of the receptacle 18. The latter has ears 19 provided thereon while the cover of said receptacle has slides 20 adapted to enter slots 21 in said ears. These slots can be so arranged, if desired, that the cover will be made to fit tightly the receptacle.

At 22 I show a means for deflecting the gum, oozing from the wound, into the cap 12 which consists of a flange in the shape of an angle-iron having the extending portion 23 curved as shown and adapted to engage one end of the slot 14 the width of said extension being substantially equal to the width of the slot.

The receptacle is made preferably of galvanized sheet iron.

The operation of the device will be readily understood. To mount the device a hole is bored into the tree to the desired depth and the tree is chipped as indicated at 15 which causes the turpentine to flow from the part of the tree adjacent thereto. This wound naturally heals in the course of time, and it is necessary, at known intervals, to open the wound to give new running life to said wound. This is done by chipping off a thin portion at the upper end of the wound by a special tool for this purpose. It will therefore be observed that I have combined the chipping process for collecting turpentine with the process for extracting by means of a closed receptacle. Evaporation of the turpentine is thereby prevented, while dirt, chips, water, etc., are excluded from the turpentine receptacle.

A most important feature is the fact that it is not necessary to remove the receptacle when it is desired to open up the wound.

I desire it to be understood that I do not limit myself to the exact construction shown as it is obvious that changes can be made in point of detail without, in any way, deviating from the spirit of the invention. For instance it is obvious that the circular or cylindrical form of cap shown could be made rectangular or triangular; hence a different form of perforation in the tree. The receptacle 18, while shown as rectangular could be made circular in cross section. Other obvious changes would at once occur to the mechanic and which would fall within the spirit and scope of the appended claims.

I claim:

1. A turpentine extractor, comprising a closure for a collecting receptacle, a spout connected to said closure, a cap connected to said spout having a slot in the upper portion thereof to receive the turpentine from chipped surfaces on a tree.

2. A sap extractor comprising a closed receptacle, a cap adapted to enter a recess formed in a tree, and means for connecting the receptacle and cap, said cap provided with an inlet orifice in its upper marginal portion through which the sap from chipped surfaces flows.

3. A sap and gum extractor comprising a cap adapted to fit a hole in a tree, a spout connected thereto, and a closed receptacle connected to the spout, said cap provided with a slot in the upper portion through which the sap flows from chipped surfaces, and flanges engaging the slot of the cap in either end thereof and fixed to the lower portion of the chipped surfaces to deflect the gum exuding therefrom into the collecting receptacle.

4. In a turpentine vessel, a cap for said vessel adapted to enter a perforation in a tree and provided with a slot in the upper portion thereof through which the turpentine flows into the vessel from chipped surfaces, and flanges connected to the lower part of the chipped surface and having a portion engaging the slot of the cap to deflect the gums into said receptacle, substantially as described.

5. A turpentine extractor comprising a closed receptacle, and conducting means connected at one end to said receptacle the other end of which enters a recess in a tree, said means having a perforation in the upper marginal portion of the part which enters the tree through which the sap and gum enters from a scarred surface on the tree above the said means.

6. A turpentine extractor, comprising a closure for a collecting receptacle, a cap connected to said receptacle and having a slot in the upper portion thereof to receive the turpentine from chipped surfaces on a tree.

7. A sap or gum extractor comprising a cap formed of a substantially flat plate, provided with a shallow rearwardly extending flange, an inlet orifice in the upper portion of said flange through which the sap from chipped surfaces flows, and a closed collecting receptacle connected to and supported by said cap to receive the gum from the said cap.

8. In a sap or gum extractor, a conduit adapted to enter a recess in a tree and to conduct the sap or gum from the tree to a collecting receptacle adjacent thereto, said conduit located immediately below a substantially V-shaped scar on the tree, and an angular flange secured to the lower part of said scar for deflecting the sap or gum oozing or dripping from the scar, toward the said conduit.

In testimony whereof I affix my signature in the presence of two subscribing witnesses.

FREDERICK WILLIAM DOCK.

Witnesses:
   Jno. D. Bellamy, Jr.,
   M. Rosenmann.

---

Copies of this patent may be obtained for five cents each, by addressing the "Commissioner of Patents, Washington, D. C."